United States Patent [19]

Robinson

[11] 4,362,130
[45] Dec. 7, 1982

[54] SUPPLEMENTARY COMPOSITION FOR AND A METHOD OF COMBUSTION-BURNING OF GASOLINE

[76] Inventor: Antonio Robinson, 644 Sound Ave., New York, N.Y. 10473

[21] Appl. No.: 266,995

[22] Filed: May 26, 1981

[51] Int. Cl.³ ............................................. F02B 47/04
[52] U.S. Cl. .................................. 123/1 A; 123/25 R; 123/25 E; 123/198 A; 123/518
[58] Field of Search ................. 123/1 A, 198 A, 25 R, 123/25 A, 25 B, 25 E, 25 L, 518

[56] References Cited

U.S. PATENT DOCUMENTS

| | | | |
|---|---|---|---|
| 1,608,018 | 11/1926 | Eldred | 123/25 B |
| 3,172,348 | 3/1965 | Berg | 123/518 |
| 3,352,294 | 11/1967 | Biller et al. | 123/519 |
| 3,816,083 | 6/1974 | Patterson | 123/1 A |
| 3,818,875 | 6/1974 | Phillips et al. | 123/1 A |
| 3,875,922 | 4/1975 | Kirmss | 123/198 A |
| 4,037,568 | 7/1977 | Schreiber | 123/1 A |
| 4,076,002 | 2/1978 | Mellqvist | 123/25 R |
| 4,138,970 | 2/1979 | Harmon | 123/25 R |
| 4,214,615 | 7/1980 | Boyer | 123/1 A |

Primary Examiner—Ira S. Lazarus

[57] ABSTRACT

In a preferred embodiment, the method includes admixing air, gasoline vapor, and vaporous droplets of a water solution of calcium hydroxide in the form of a vaporous mixture which is thereafter heated to a temperature of from about 135 and 145 degrees Fahrenheit, and thereafter mixing the admixture with a gasoline-air fuel mixture to form a final combustion fuel mixture in a heated state, and thereafter burning it in the fuel chamber of an internal combustion engine, where the method is accomplished by the passing of air through a gasoline automobile tank and the bubbling of the mixture of the air and gas vapor by passing through a water solution of the metal hydroxide that also preferably includes a metal chlorate at about 35 to 45 grams per gallon of the water solution of hydroxide, and the heating is accomplished by manifold vacuum drawing the mixture in isolation within a tube of copper through manifold space of an engine prior to admixing it with the gasoline-air fuel mixture. The preferred vaporous composition contains vapors and/or droplets of air, gasoline and a water-solution of a metal hydroxide having a metal chlorate added thereto.

13 Claims, 3 Drawing Figures

SUPPLEMENTARY COMPOSITION FOR AND A METHOD OF COMBUSTION-BURNING OF GASOLINE

This invention relates to a novel vaporous composition of gasoline, and an improved method of the combustion-burning of gasoline in a combustion engine.

BACKGROUND OF THE INVENTION

A patentability search disclosed Kirmss U.S. Pat. No. 3,875,922 which discloses the passing of air through an aqueous solution of methanol and acetone in order to provide a vapor thereof which is fed into a gasoline-air mixture and thereafter channeled to a motor combustion chamber. The vapor is admixed by passing it directly into the carburetor air input channel. The Eldred U.S. Pat. No. 1,608,018 discloses mixing gasoline tank gas vapor and crank case oil vapor and radiator steam with combustive quantities of carburetor vaporized gasoline fuel prior to burning the final mixture in a gasoline combustion engine. That mixture is preheated by association of a tube thereof with an exhaust manifold prior to being channeled to the internal combustion engine chambers. The Berg U.S. Pat. No. 3,172,348 discloses substantially the same as the above-noted Eldred patent, the Berg patent disclosing admixing gasoline tank fumes with crankcase oil fumes and with air and the ordinary gasoline fumes or vapor, and thereafter feeding this final mixture into the gasoline engine manifold intake. Likewise, the Biller et al. U.S. Pat. No. 3,352,294 shows various connections between the carburetor, the engine manifold intake, the gas tank, and vent, the purpose is entirely different from that of the other above-noted patents, namely for having absorption beds preventing the polluting of the atmosphere. The Harmon U.S. Pat. No. 4,138,970 discloses a bottle-like device for obtaining a vaporous mixture of air and water which is fed to the vacuum source of a fuel inlet of an internal combustion engine. The Mellqvist U.S. Pat. No. 4,076,002 appears to disclose basically the same thing as above, namely a container for moistening air which is then admixed with the fuel mixture by injection by vacuum into the manifold intake. Accordingly, these various patents disclose various approaches and efforts to enhance gasoline mileage by gasoline combustion engines and to reduce air pollution, principally addressed to the concept of admixing moist air and possibly gasoline fumes with gasoline fuel at either the carburetor or the manifold intake. Solely the above-noted Kirmss patent discloses that the air and vapor mixture may contain methanol and acetone as an ingredient vapor thereafter admixed with the gasoline-air mixture. Because of the recent great increase in the prices and cost of gasoline, together with other inflationary costs of maintaining an automobile, there has been a major movement of the buying public toward the purchase of automobiles that obtain higher gasoline mileage than heretofore. However, there are many persons who do not have the economic means to discard the old gas-guzzling earlier models, usually larger cars, and to buy the very expensive new small cars having improved gas-mileage ratings. Also, even for the improved gas-mileage ratings of the newer smaller cars, there still remains substantial room for improvement in mileage, with regard to the high cost of gasoline, as well as relative to efficient electric cars under development, as well as relative to reducing the amount of oil used on a national basis in order to help the economy balance the foreign trade deficit.

BROAD DESCRIPTION OF THE INVENTION

Accordingly, an object of this invention is to overcome problems and disadvantages of gasoline combustion and combustion engines, of automobiles that have existed heretofore, particularly of the larger varieties.

Another object is to obtain an improved method of combustion-burning gasoline to thereby achieve an improved burning efficiency and gas mileage at reduced cost.

Another object is to improve the ecology associated with the burning of gasoline in internal combustion engines, by obtaining greater efficiency in the combustion process and to thereby reduce the normal amount and toxicity of pollutants normally put out as exhaust gases and components thereof.

Another object is to obtain prior objects by utilization of a method and elements utilized in that method, at a low cost, whereby the new novel method will be available for use economically for the average person at less than expensive costs.

Another object is to obtain a novel combustible fume composition of gasoline for internal combustion engines.

Other objects become apparent from the preceding and following disclosure.

One or more objects of the invention are obtained by the present invention as disclosed above and hereinafter, and as illustrated in the accompanying Figures which are directed principally to preferred embodiments, in order to improve understanding of the invention but not to unduly limit scope of the invention which extends to variations and modifications and substitutions of obvious equivalents, obvious to a person of ordinary skill in this field of art.

Broadly the invention may be described as a method of combustion-burning of gasoline in an internal combustion engine, in which the method includes admixing air with gasoline vapor and fine vaporous droplets of water solution of a metal hydroxide, that is at least slightly soluble in water at ambient temperatures, and thereafter heating that mixture, followed by admixing it in the heated state with gasoline-air mixture, and thereafter combustion burning the final fuel mixture in a combustion fuel chamber. While the combustion fuel chamber utilized may be that of a piston-type engine, it is also contemplated that this invention include a compression-type turbine engine or the like. In a preferred embodiment, the metal hydroxide is calcium hydroxide, which based on actual experimentation results, appears to give enhanced results as compared to other metal hydroxides. Also, calcium hydroxide is reasonably inexpensive in the manner in which it is normally conventionally commercially available as a bag of lime. Calcium oxide is not highly soluble but is sufficiently soluble in water at ambient temperatures as to provide a suitable solution of the calcium hydroxide as to serve the purposes of this invention. Accordingly, normally a bag of lime is poured into a container of water and admixed therewith and permitted to stand for a reasonable period of time such as preferably several hours. Thereafter, the water-solution diluent is poured off or otherwise separated from the undissolved solid portions settled to the bottom of the container. It is this diluent liquid that is the water solution of calcium hydroxide that is employed in the method as the preferred aqueous solution of a metal hydroxide. Preferably there is an additional vapor chamber.

It should be apparent that if a metal hydroxide having a higher solubility in water is utilized, then that particular solution should be more highly diluted to equal the approximate hydroxide concentration as has been found to be effective for the calcium hydroxide at the low level of water-solubility of calcium oxide as above-described.

When employing the above-noted calcium hydroxide aqueous solution produced from a bag of lime, it has been found at the current costs of a bag of lime, that the calcium hydroxide solution cost amounts to not more than about ten cents per gallon of water solution thereof. Utilizing this method above-described, it has been found that one gallon of the hydroxide solution will be used-up, if flow of air-gasoline vapor bubbled therethrough is adjusted to a proper conservative rate of flow, at a rate of about one gallon thereof for each ten gallons of gasoline burnt by the combustion engine.

It has been found through experience that improved mileage may result at a rate of two or three times the mileage per gallon of gasoline as compared to normal mileage obtained by any particular car under consideration. For example, it has been found that in the utilizing of a 1972 Plymouth manual gear-shift that normally now obtains (before the invention) a maximum of 15 miles per gallon of gasoline, has had a mileage increase by the employment of the novel composition of this invention and by the method of this invention, to thirty miles per gallon consistently on highway trips. It is estimated that with a new motor or new automobile, the gasoline mileage typically previously rated to obtain thirty miles to the gallon would by the present inventive combination and method, obtain at least 50 to 60 miles to the gallon, and perhaps eighty or more miles to the gallon.

While there may be any conventional or desired method of admixing the air-gasoline vapor with the metal hydroxide and producing the admixture-vapors thereof, it has been found that the preferred method of doing this is to pass the air through a void space above gasoline in a gasoline tank, and withdrawing the air-gasoline vapor mixture and passing it through the hydroxide solution in the form of bubbles or the like, in order to form a vapor thereabove of the mixture of all of these ingredients, and thereafter withdrawing this mixture vapor by manifold intake vacuum through preferably copper tubing passing through and located in the manifold space for the thereby preheating of the overall mixture vapor prior to its admixing with the gasoline-air fuel mixture in the manifold space as the normal gasoline fuel mixture is passed downwardly from the carburetor outlet, to obtain preferred efficient results associated with this invention.

Preferably the copper tubing is arranged within the manifold space such that the temperature of the panel mixture before mixing with the gasoline-air mixture, is a temperature within the range of about 120 degrees to about 160 degrees Fahrenheit, with preferred results being obtained within the range of about 135 degrees to about 145 degrees Fahrenheit.

Enhanced gas mileage and acceleration pick-up have been obtained by the addition of a chlorate such as sodium chlorate preferably, or potassium chlorate, in an amount of about 20 to 60 grams of sodium chlorate per gallon of solution of the metal hydroxide. Preferred results are obtained within a range of about 35 to 45 grams of the sodium chlorate per gallon.

It is significant to note that actual tests have been conducted which merely utilized a solution or emulsion of gasoline and water, devoid of any ingredient such as a metal hydroxide or a metal chlorate; the vapor was likewise preheated and fed into a mixture with a normal gasoline-air fuel admixture at the point of the manifold intake of an internal combustion engine, and little if any enhancement in gas mileage was noted.

In another type of comparative experiment, the Applicant's admixture or solution of metal hydroxide vapor having also a part thereof the gasoline-air vapor, was directed directly to the throat space of the carburetor and admixed there with the normal gasoline-air fuel carburetor mixture; thereafter, burning it when channeled to the internal combustion engine obtained a result of no noticeable enhancement in gas mileage nor any other advantages obtained.

Accordingly, by other testing it appears that in order to obtain the improved efficiency of the present invention, the vapor mixture of gasoline vapor and air from the gas tank, and aqueous droplets or vapor of metal hydroxide, must be admixed with the normal gasoline-air fuel mixture (from the carburetor) at the point within the manifold intake or at its opening. Moreover, it was found that for the maximum preferred results, it is essential that there be provided a substantially large amount-(degree) of preheating of the admixture of the gas-tank gasoline-vapor and gas-tank air and vapor of water-solution of the metal hydroxide, prior to its mixing with the gasoline-air fuel (from the carburetor), followed by burning in the fuel chambers after the mixing in and feeding from the manifold intake inlet space.

In addition to obtaining enhanced greater gas mileage, above-noted, it has been found that the inventive mixtures obtain also an improvement of acceleration whenever more gas if fed upon necessity for or desire for acceleration of the speed of the automobile. Also, upon breaking-down the engine and examination of the piston combustion chambers and the exhaust pipe and fumes for an automobile burning the inventive composition by the inventive method, it has been found that there is a substantial major reduction in the amount of pollutants, evidencing more complete combustion with its higher efficiency thus accompanied by reduction in pollution of the atmosphere. It has been further found that the surfaces within the piston chambers, and the pistons themselves, and associated areas of the exhaust pipe have a clean shiny appearance, rather than a coated soiled appearance. It has also been found when utilizing the composition and method of this invention, that the use of crank case oil by even an old model and worn automobile, is reduced to a major degree, to an extent that it is rarely necessary to add new oil to the crank case. Use of the additional vapor chamber above the gas tank enhances motor performance and mileage when the gas tank is filled-up.

While all of the reasons for these observations are not fully understood, nevertheless, all of these matters have been verified by controlled-conditions experiments, as above-noted.

Thus far, solely a novel method has been described. It should be apparent that also the present invention includes the novel vaporous combination of gasoline-air vapor from the gas tank (in this instance of examples given), and vapor of the aqueous solution or suspension of a metal hydroxide, preferably calcium hydroxide, and that vapor preferably also including a metal chlorate such as sodium chlorate.

It should be further noted that efforts were made to admix and aqueous solution of a metal hydroxide with gasoline liquid, and to burn that solution or admixture by passing the vapors thereof through the carburetor in a conventional manner; the results were frustrating and non-productive, obtaining no enhancement in mileage, and in fact, tending to reduce mileage and proper combustion. Additionally, in such an arrangement, the water tended to rise to the top of the mixture or emulsion within the gas tank. It is conceivable that some sort of emulsifying agent might be utilized, but this would add cost and the results of the attempted burning (in any event) were negative, as above-noted.

Thus, tests as noted have verified that the Applicant's various steps and procedures and composition as described, are each and all indeed critical and must be followed and utilized to obtain the beneficial results of this invention, aside from the preferred embodiments noted which obtain even further improved results.

The invention may be better understood by making reference to the following figures.

THE FIGURES

DETAILED DESCRIPTION OF THE INVENTION

Figure 1:
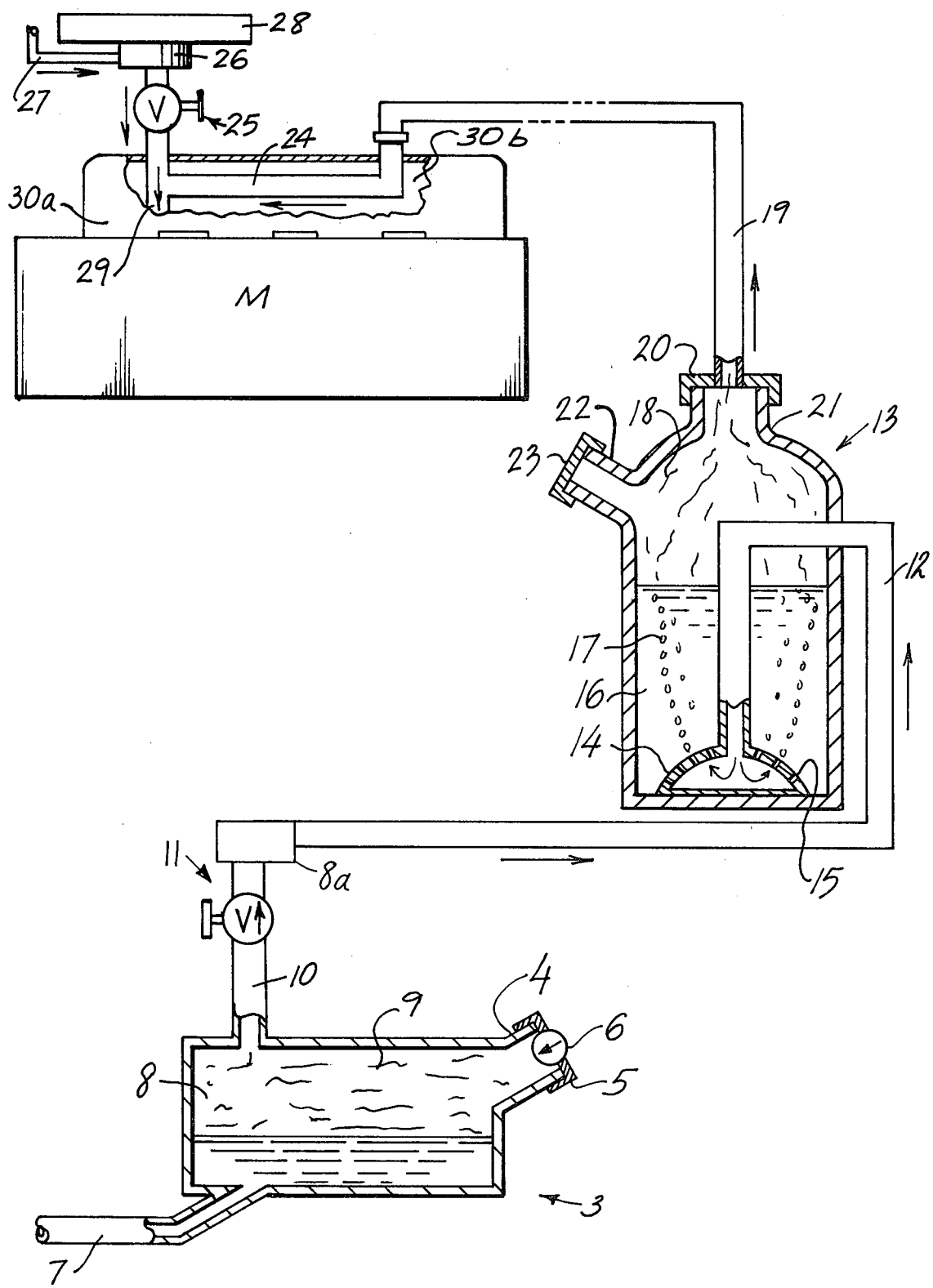
FIG. 1 illustrates a diagrammatic flow diagram of the method of the invention illustrated in partial cut-away and cross-section as a side view thereof, showing the gas tank, connecting conduit to the mixing vessel, its connecting conduit to the automobile engine and manifold, etc.
Figure 2A:
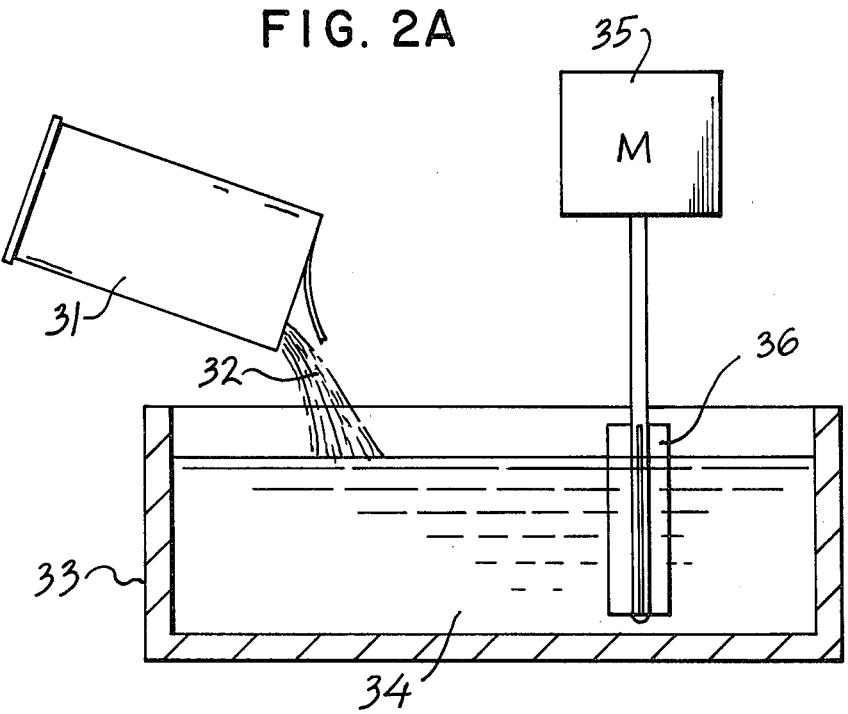
FIG. 2A illustrates diagrammatically the metal hydroxide mixing vessel and mixer mechanism and the lime-containing bag being poured of its contents into the water of the mixing vessel, with side cross-sectional view of the mixing vessel.
Figure 2B:
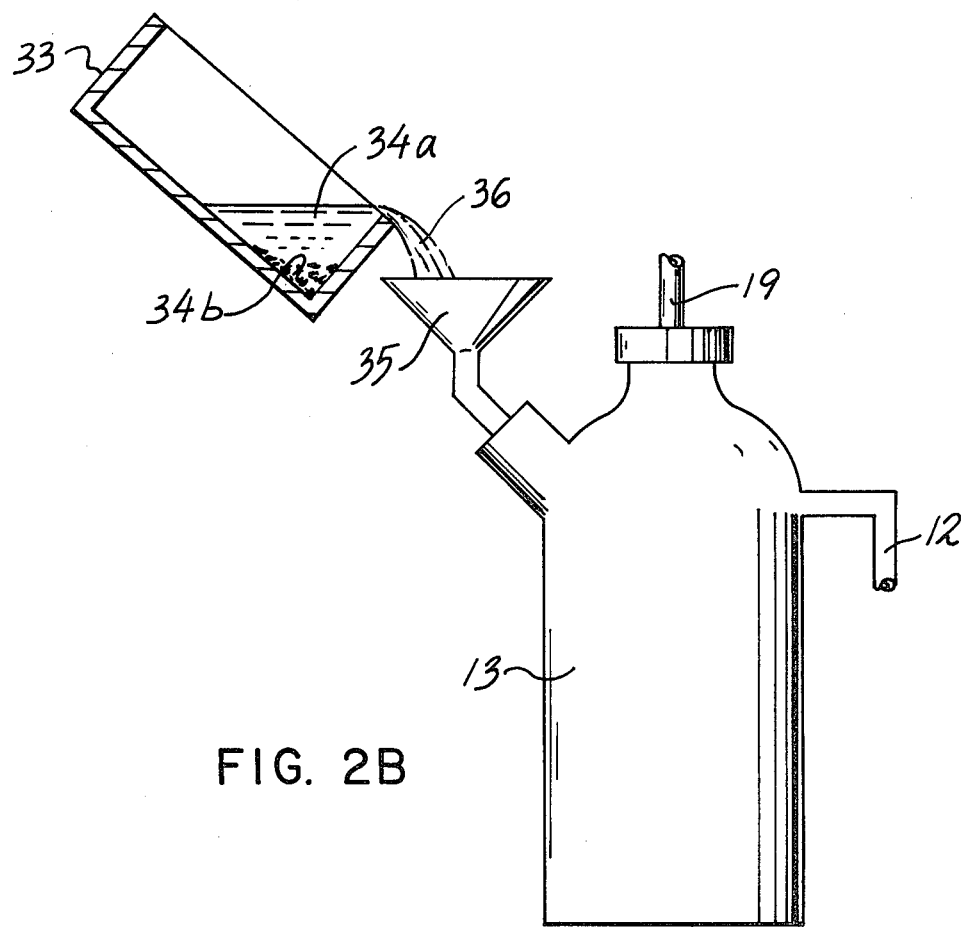
FIG. 2 illustrates the pouring of the hydroxide solution or suspension from the vessel into a funnel and thereby into the gas-mixing or vapor mixing vessel, diagrammatically, and the solution mixing vessel being shown in side cross-sectional view, with undissolved portions remaining in the bottom thereof.

FIGS. 1, 2A and 2B disclose a common embodiment of the invention, insofaras the mechanical elements utilized, and thus common identifying indicia are utilized for the same or corresponding parts shown in different figures, and once described, that description is not normally to be repeated for other figures except for convenience of identification.

FIG. 1 illustrates both the elements and a method of combustion-burning of gasoline in an internal combustion engine. FIG. 2A shows the preliminary steps of adding lime and elements for the mixing thereof with water and the mixing thereof. The FIG. 2B show pouring the prepared liquid or aqueous solution into the vapor mixing vessel used in the FIG. 1 illustration.

Accordingly, FIG. 1 shows diagrammatically a gas tank 3 of typically an automobile, having its normal gasoline outlet 7 diagrammatically (symbolically) shown, the gasoline input neck and port 4 having a conventional screw-on cap 5 mounted thereon, the cap 5 having a one-way air-inlet valve 6 for ready admission of ample air into the tank space. Also there is shown the vapor-space 8 above the gasoline in the tank, having gasoline-air mixed vapors 9 in that space drawn-off through vapor-outlet conduit 10 past the flow-regulation manual (or automatic if desired) valve 11 for the adjusted or regulated rate of flow though conduit 12 into the mixing or bubbling device 14 having apertures 15. The mixture of gasoline-air vapors transmitted through the conduit 12 into the free-space of device 14 bubble upwardly through apertures 15 upwardly into and through the metal hydroxide solution and/or suspension 16 as bubbles 17, by which vapors and/or droplets of the solution or suspension are carried upwardly in admixture with the bubble-vapors into space 18 from which vacuum differential pressure from the manifold inlet of the motor of an automobile draws the mixed vapors and/or suspensions into and through conduit 19. The mixed vapors drawn into and through conduit 19 are directed into the copper tubing 24 mounted within manifold space 30b of the engine manifold 30a, in which copper tubing the mixed vapors fed from conduit 19 become preheated by virtue of engine heat resulting from the gasoline-combustion within the combustion piston chambers of the engine; although such has proven by actual experience to be not necessary, an auxiliary heater such as by battery electricity for an electric heater before tube 19 enters the manifold space. It should be recognized also that to some extent any equivalent mechanism of preheating other than within the manifold space is permissible such as by the exhaust manifold or exhaust pipe; however, the preferred place is substantially as diagrammatically shown because of the immediate proximity of the peak-heating of the vapors and the simultaneous mixing at substantially the same location with the gasoline-air fuel mixture being fed from the carburetor 26 through the flow-control valve 25 to the final mixing-space 29 from which the final mixture of the fuel mixture of the carburetor and the preheated mixture of vapors from the preheating copper tube 24 are thereafter directed in any conventional manner or desired manner and by conventional and/or desired mechanisms and structures for the engine such as here illustrated to be an internal piston combustion engine. The final mixture is thus fed to fuel chambers associated with the conventional piston firing combustion chamber for the motor designated M in FIG. 1. The gasoline is fed to the carburetor 26 by fuel inlet line 27, and air is provided through the air filter 28, for the conventional mixing of gasoline with air.

In FIG. 2A, there is shown the pouring of lime 32 from a typically commercially-available sack(bag) 31 of lime—which in effect is Calcium oxide. Upon the pouring of the lime 32 into the water 34 within the vessel 33, and admixing by any suitable mechanism such as mixer 35 with mixing blade or paddle 36, the dissolving thereof to react with the water to form a water solution of calcium hydroxide is effected. As above-noted, the solubility of calcium oxide, i.e. when hydrated to become calcium hydroxide, is low; however, sufficient solution is obtained with calcium hydroxide as proven by actual experimentation and results observed. As also noted above, on the basis of the solubility of calcium hydroxide in water at ambient temperatures, it is a simple matter to the ordinary artisan to calculate the comparable equivalent concentration of dissolved metal hydroxide for some other hydroxide having either greater or lesser solubility in water. For a metal hydroxide having greater solubility, the solution would obviously have to be diluted to the appropriate extent. To the present inventor and his invention, it is immaterial as to whether there is solely the "solution" phase in the vapors carried from space 18 into the conduit 19, etc., or whether undissolved calcium hydroxide in suspension or the like is actually carried in the form of droplets. The fact is, it works. For convenience of terminology, the calcium hydroxide is generally in this disclosure referred to as vapors thereof for the space 18, etc.

In FIG. 2B, the vessel 13 is again shown, with the fill-cap 23 being removed and not shown in this figure, having the funnel 35 inserted, and there is illustrated a pouring of the mixture and/or suspension and/or solution 34 (as the case may be, as above-discussed) as solution 36 from vessel 33 into the funnel and thereby into the vessel 13. There is also shown diagrammatically the input conduit 12 previously discussed, and the outlet conduit 19 previously discussed. Also shown is the typical residue or undissolved residual of the lime or calcium hydroxide, shown as residual 34b as solids left in the vessel 33.

In the practice of the present invention, the vessel 13 has been normally placed in the trunk of the rear of the car, immediately above the gas tank, since such is a convenient location as well as reducing the length of the conduit 12. However, any convenient location may be utilized.

The vessel 13 is typically a cylindrical structure about ten inches high, tapered at the top end, and has a cylinder diameter of about six inches typically.

When the motor starts, it is the vacuum from the manifold intake that by suction through the above-described connecting conduits and the like, that causes the gasoline vapor in the gasoline tank to become mixed with air drawn into the vapor space through the gas tank cap 5 at valve 6, and thereupon the mixed gasoline and air vapors-gases drawn into the solution 16 as the bubbles, and eventually mixed with the fuel-air mixture from the carburetor at the manifold mixing location before channeling to the respective piston combustion chambers.

It has been found by experience that the motor utilizing the method and composition of this invention starts immediately under many varied summer and winter conditions, be it hot weather or winter frigid weather.

Most of the automobile tests conducted as above noted, have been in a 1972 Plymouth Duster that has a 225 cubic inch motor and that had approximately 73,000 miles on the motor and automobile, of usage, prior to beginning the experiments with the present invention. No motor repairs have been done before nor during the time of conducting of experiments.

In a time like the present in which the United States is beset by shortages of fuel and by external competition, this invention may put the American automobile industry back into a position in which it can compete with the rest of the world, hopefully.

It is within the scope and contemplation of the present invention to make such variations and modifications and substitution of equivalents as would be obvious to a person of ordinary skill. Accordingly, the drawings of the figures above-described are not intended to be limiting, and are intended to primarily merely improve understanding of the invention.

The additional vapor-space provided by the additional vapor chamber 8a which is optional but preferred, and provides necessary space for ample available volume of the mixing of and mixture of vapors of gasoline and air provided to the tank through valve 6.

It should be further noted that the valve 6 need not necessarily be located in the lid or cap 5, but alternatively may be mounted in a separate large-volume vent-like pipe leading into the top space of the gas tank, or even bubbling through the gas located in the gas-tank, and typically there may be present as a part of the valve or in flow series therewith, an air filter.

While it has been above-noted that one further utility of the present invention is the beneficial effects observed in the producing of a clean exhaust output, such is typified by the very recent New York Inspection exhaust analysis from the above-noted 1972 Plymouth Duster, as follows: Inspection date—May 5, 1981; Cylinders—6; mileage: 73,815; HC(i.e. hydrocarbons) PPM—0350, as compared to the State (N.Y.) limit of a maximum 1990; CO%: 0.73, as compared to N.Y. State limit of a maximum 9.00%; $CO_2$%; 12.3, as compared to a much higher N.Y. State limit (not-stated on the State form), this results stated to be "valid test", and no equipment failed, to the surprise of the inspectors.

It should be now apparent that there is much merit to this invention, as above disclosed and hereinafter claimed.

I claim:

1. A method of combustion-burning gasoline in an internal combustion engine, comprising in combination; admix air, gasoline vapor, and fine vaporous droplets of a water solution of a metal hydroxide that is at least slightly soluble in water at ambient temperatures; sufficiently to form a first mixture in vaporous form; thereafter heating said first mixture; thereafter admixing said heated first mixture with a gasoline-air fuel mixture sufficiently to form a form a final fuel mixture in a heated state; and combustion-burning the final fuel mixture within a combustion fuel chamber.

2. A method of claim 1, in which said metal hydroxide is calcium hydroxide.

3. A method of claim 1, in which said admixing of air, gasoline vapor and fine vaporous droplets comprising passing air through space above gasoline in a gasoline tank and withdrawing an air-gasoline vapor mixture and passing the air-gasoline vapor mixture through a quantity of a water solution of said metal hydroxide.

4. A method of claim 3, in which said heating comprises passing said first mixture in an isolated relationship through manifold space of a fuel combustion engine sufficiently to heat said first mixture to a temperature within a range of about 120 degrees and 160 degrees Fahrenheit.

5. A method of claim 4, in which said temperature range is between about 135 and 145 degrees Fahrenheit.

6. A method of claim 5, in which said water solution includes sodium chlorate in an amount of from about 20 grams to about 60 grams, per gallon of water.

7. A method of claim 6, in which said sodium chlorate is in an amount of from about 35 grams to about 45 grams, per gallon of water.

8. A method of claim 5, in which said water solution includes potassium chlorate in an amount of from about 20 grams to about 60 grams, per gallon of water.

9. A method of claim 8, in which said potassium chlorate is in an amount of from about 35 grams to about 45 grams, per gallon of water.

10. A method of claim 1, in which said water solution includes a soluble metal chlorate.

11. A method of claim 1, in which said heating comprises heating said first mixture to a temperature within a range of about 120 degrees and 160 degrees Fahrenheit.

12. A method of claim 11, in which said range is from about 135 degrees to about 145 degrees Fahrenheit.

13. A method of claim 3, in which said passing air through said space, and in which said withdrawing, and in which said passing the air-gasoline vapor mixture each comprises applying vacuum of said combustion fuel chamber when the fuel chamber is in operation as a part of a fuel combustion engine.

* * * * *